United States Patent [19]
Brandt et al.

[11] 3,721,018
[45] March 20, 1973

[54] GRAIN STEAMING APPARATUS

[75] Inventors: Maurice W. Brandt; Franklin J. Shears, both of Fremont, Mich.

[73] Assignee: Gerber Products Company, Fremont, Mich.

[22] Filed: April 21, 1971

[21] Appl. No.: 136,016

[52] U.S. Cl. ............................34/168, 34/64, 34/174
[51] Int. Cl. ..............................................F26b 17/12
[58] Field of Search........34/36, 37, 64, 65, 167, 168, 34/169, 174

[56] References Cited

UNITED STATES PATENTS

| | | | |
|---|---|---|---|
| 2,430,669 | 11/1947 | Crowley | 34/168 X |
| 3,315,372 | 4/1967 | Nettel et al. | 34/168 |
| 785,119 | 3/1905 | Provost | 34/168 |
| 1,574,210 | 2/1926 | Spaulding | 34/170 X |
| 773,877 | 11/1904 | Lorillard | 34/92 |

*Primary Examiner*—Kenneth W. Sprague
*Assistant Examiner*—James C. Yeung
*Attorney*—Townsend and Townsend

[57] ABSTRACT

Grain steaming apparatus comprising a tower having three sections, an upper section, a central section, and a lower section. The grain to be steamed is introduced into the top of the upper section, and steam is communicated into the interior thereof via a pair of steam manifolds. The lower section of the tower comprises a baffle arrangement adapted to control the flow of wheat in the tower while preventing channeling of the grain, to achieve uniform grain flow across the cross section of the tower. The baffle arrangement may preferably be formed by a plurality of perpendicularly disposed plates forming a grid work of substantially square, tapering passages. In this manner, the resistance encountered by the grain from the lower constriction of the tower will be distributed substantially uniformly across the cross section of the tower.

9 Claims, 5 Drawing Figures

PATENTED MAR 20 1973 3,721,018
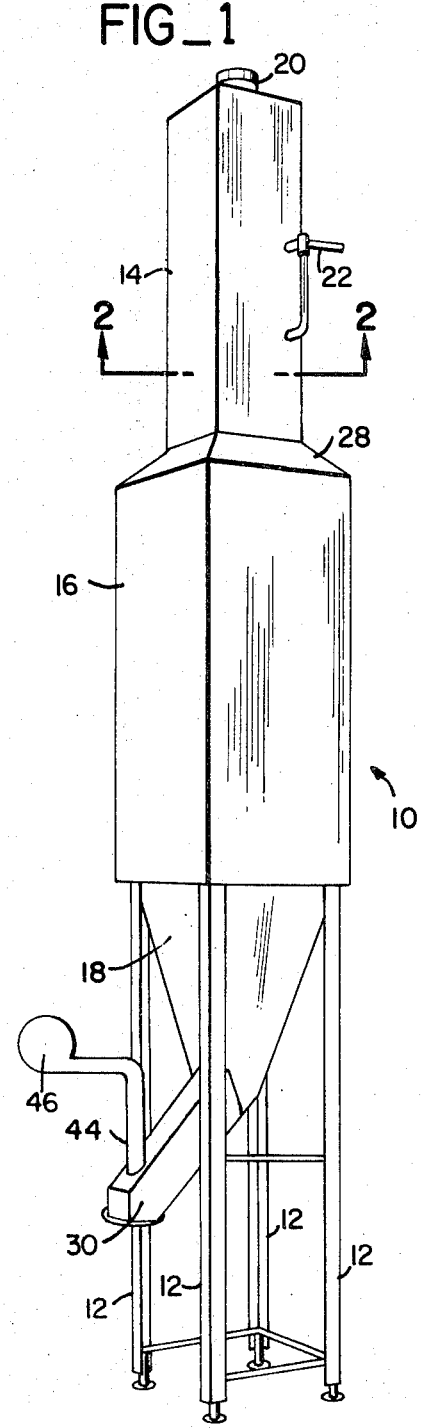
FIG_1
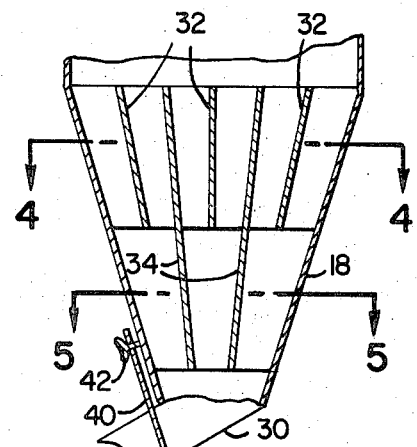
FIG_3
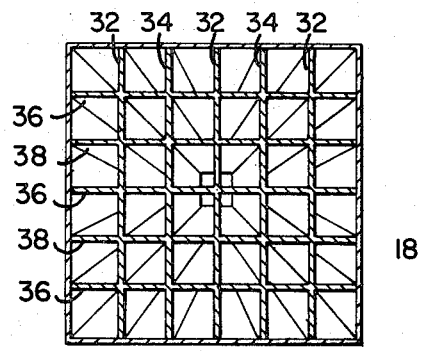
FIG_4
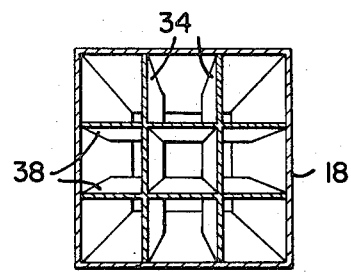
FIG_5
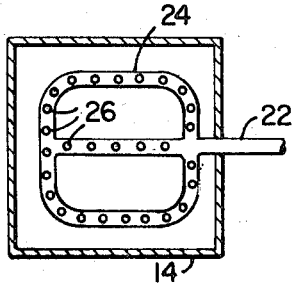
FIG_2
INVENTORS
MAURICE W. BRANDT
FRANKLIN J. SHEARS
BY
Townsend and Townsend
ATTORNEYS

GRAIN STEAMING APPARATUS

This invention relates to apparatus for steaming grains, legumes and the like, as well as deactivating enzymes. In a preferred embodiment, the invention is directed to grain steaming apparatus adapted for the steaming of wheat.

In the production, storage and distribution of cereal, an often encountered problem is the caking of the cereal when exposed to conditions of high humidity. Such caking can be substantially eliminated by minimizing the reducing sugar content, namely dextrins and maltose, of the cereal. The reducing sugars in cereals are, in part, produced by the diastatic enzymes in the flour acting upon the starches also contained therein. In particular, applicants have found that wheat is particularly high in diastatic enzymes.

According to the present invention, the reducing sugar content of cereal is minimized by deactivating the diastatic enzymes in the grain prior to milling. Specifically, this is accomplished by steaming the grain. In the case of wheat, applicant has found that steaming the wheat berry for approximately 2 minutes at 210° F effectively deactivates the diastatic enzymes. Thus, according to the present invention, there is provided a grain steaming tower, the grain being introduced into the top of the tower. Steam is communicated into the interior of the upper section of the tower via a pair of steam manifolds. The lower section of the tower comprises a baffle arrangement adapted to control the flow of wheat in the tower to provide for a desired transit time of 2 minutes from the upper section of the tower, through the central section of the tower or holding zone, and out the bottom or exit of the tower. In addition, the baffle arrangement functions to prevent channeling of the grain, to achieve uniform grain flow and thus uniform enzyme deactivation.

Accordingly, it is an object of the present invention to provide a method and apparatus for deactivating the diastatic enzymes in grains, such as wheat.

Another object of the present invention is to provide apparatus characterized by simplicity of design and operation and sanitary construction for ease of dismantling and cleaning to minimize bacterial buildup.

Another object of the present invention is to provide a grain steaming tower having an upper section into which the grain is introduced and into which steam is fed, a central or holding section, and a lower baffle section adapted to control the flow of grain through the tower while preventing channeling of the grain.

The grain steaming apparatus according to the present invention is advantageous in that it effects the deactivation of the diastatic enzymes in grain simply, efficiently and in a minimum of time. Furthermore, the baffled lower section of the tower substantially minimizes channeling of the grain as encountered in prior art devices, thus improving the uniformity of the enzyme deactivation of the grain produced by the steaming process. Thus, the apparatus and procedure of the present invention permits production of cereals of improved quality, and is further advantageous as it does not interfere with conventional grain milling or cereal producing techniques.

These and other objects, features and advantages of the present invention will be more readily apparent from the following detailed description of the present invention with reference to the accompanying drawings, wherein:

FIG. 1 is a perspective view of grain steaming apparatus according to the present invention;

FIG. 2 is a sectional view taken along the line 2—2 in FIG. 1;

FIG. 3 is a cross-sectional view of the lower portion of the apparatus depicted in FIG. 1;

FIG. 4 is a sectional view taken along the line 4—4 of FIG. 3; and

FIG. 5 is a sectional view taken along the line 5—5 of FIG. 3.

Referring now to the drawings, there is depicted grain steaming apparatus, shown generally at 10, according to the present invention. Grain steamer 10 comprises a tower supported by four legs 12. The tower may be regarded as being formed of three sections, a top or upper section 14, a central section 16, and a lower section 18.

Top or upper section 14 comprises a hollow, vertically elongate column of substantially square cross section. The upper section 14 is closed with the exception of a single aperture communicating with an inlet tube or pipe 20 into which the grain to be steamed is introduced. The lower end of upper section 14 is open to permit the grain to pass therethrough and thus proceed through the remaining sections of the tower.

Steam is introduced into the upper section 14 of the tower via an inlet pipe 22 which communicates with a pair of steam manifolds 24 disposed within upper section 14. Manifolds 24 comprise tubing having a plurality of holes 26 on the underside thereof formed in a manner to substantially uniformly distribute the steam passing therethrough over the cross section of upper portion 14. As is apparent from FIG. 2, manifold 24 may preferably take the shape of a square perimeter of tubing having a single tube crossing intermediate the sides thereof. In this manner, the manifolds 24 will not substantially interfere with the downward flow of grain through the tower, but will nonetheless uniformly distribute the steam over the across section of the tower. Since holes 26 are in the underside of manifold 24, the steam issuing therefrom will be directed downwardly to minimize the escape of steam from the top of the tower, and thus maximize the absorption of steam by the grain.

The bottom of upper section 14 is open and communicates with the central section or holding zone 16 of the tower. The central section or holding zone 16 comprises a hollow, elongate column of rectangular cross section, the cross section of central section 16 being greater than the cross section of upper section 14. In order to interconnect upper section 14 and central section 16, a tapered section 28, taking the form of a hollow, truncated pyramid, is provided between upper section 14 and central section 16. The bottom of central section 16 is, of course, open, to permit the grain to pass therethrough into lower section 18 of the tower.

Lower section 18 of the tower comprises a hollow, inverted, truncated pyramid of rectangular cross section. The bottom of lower section 18 is connected to a rectangular outlet pipe 30, through which the grain exits the tower.

Contained within lower section 18 are a plurality of plates suitably disposed to form a baffle arrangement for preventing the channeling of the grain. Specifically, five trapezoidal plates 32 and 34 are provided extending perpendicularly from side to side of lower section 18. Plates 32 and 34 are inclined in a manner to conform to the pyramid shape of lower section 18. Of these plates, three plates 32, namely those plates adjacent the sides and in the center of lower section 18, extend downwardly to a first or lesser depth. The remaining two plates 34 extend downwardly to a second or greater depth. Similarly, five trapezoidal plates 36 and 38 extend perpendicularly from the other sides of lower section 18. Specifically, three plates 36, namely the plates adjacent the sides and center of lower section 18 extend to the first or lesser depth while the remaining two plates 38 extend to the second or greater depth.

As apparent from FIGS. 4 and 5, this creates a tapering rectangular grid work or baffle within lower section 18. Specifically, extending within lower section 18 to the first or lesser depth is a matrix of plates which form 36 substantially square, tapering passages. Similarly, the plates 34 and 38 which extend downwardly to the second or greater depth create a matrix of plates forming nine square, tapering passages. The baffling thus formed acts to divide the flow of grain in the tower, so that the resistance encountered by the grain from the lower constriction of the tower will be substantially uniform across the cross section of the tower. Accordingly, the channeling of the grain within the tower will be minimized, assuring a substantially uniform flow of grain across the cross section of the tower.

As briefly referred to hereinbefore, rectangular pipe 30 comprises the grain exit from the tower. Disposed within pipe 30 is a valve plate 40, adapted to obstruct the passage of grain through pipe 30 so as to enable control of the flow therethrough. Specifically, valve plate 40 is slideably engaged in pipe 30, so that plate 40 can be extended into pipe 30 to any desired depth. Plate 40 is secured in place by a wing nut 42 which mounts plate 40. In this manner, the flow of grain through the tower may be regulated to achieve the desired steaming of the grain.

Pipe 30 may include an opening communicating with a filtered pipe 44. Pipe 44 may be connected to a vacuum pump 46 to permit removal of dust or other foreign matter present in the grain. Of course, the filter within pipe 44 will prevent grain from being exhausted therethrough.

The grain issuing from the end of pipe 30 may be conveyed away by conventional means. For example, the end of pipe 30 may communicate with a conventional pneumatic conveying system for transporting the steamed grain to the next desired location, typically a milling machine.

In operation, the grain to be steamed is introduced into the top of the tower via inlet pipe 20. Steam is provided at inlet pipe 22 and is communicated to the grain via steam manifolds 24. Due to the action of gravity, the grain will pass downwardly through the tower. The baffle arrangement contained within lower portion 18 of the tower will substantially prevent channeling of the grain as referred to hereinbefore.

By suitable adjustment of valve 40 in exit pipe 30, the desired flow rate of grain may be achieved. Applicant has found that the diastatic enzymes in wheat will be substantially deactivated if the wheat is steamed at 210° F. for approximately two minutes. Accordingly, valve 40 may preferably be adjusted to achieve a flow rate corresponding to a transit time of two minutes from the top of the tower to the exit.

While a particular embodiment of the present invention has been shown and described in detail, it is apparent that adaptations and modifications may be made without departing from the true spirit and scope of the invention, as set forth in the claims.

What is claimed is:

1. Grain steaming apparatus comprising a vertical tower having an upper section with an opening at the top thereof for receiving said grain, means for introducing steam into said upper section, a central section disposed below said upper section and communicating therewith, a lower section disposed below said central section and communicating therewith, said lower section defining a hollow inverted truncated pyramid of substantially square cross-section, said lower section further having an outlet at the bottom thereof, baffle means interior said lower section for preventing the channeling of said grain, said baffle means comprising a plurality of mutually perpendicular plates disposed within said lower section, each of said plates being trapezoidal and inclined in conformity with the pyramid shape of said lower section to form a plurality of substantially square tapered passages.

2. Apparatus according to claim 1 wherein at least two parallel of said plates extend downwardly to a greater depth than the others of said plates to form tapered passages below said first plurality of passages.

3. Apparatus according to claim 1 wherein said upper section and said central section comprise hollow elongate columns of substantially square cross section.

4. Apparatus according to claim 3 wherein the cross section of said central section is greater than the cross section of said upper section.

5. Apparatus according to claim 1 wherein said means for introducing steam into said upper section comprises at least one steam manifold disposed within said upper section and means for conducting steam to said manifold.

6. Apparatus according to claim 5 wherein said manifold includes a plurality of apertures on the underside thereof for introducing said steam downwardly into said upper section.

7. Apparatus according to claim 1 further comprising valve means communicating with said outlet for controlling the flow of grain therethrough.

8. Apparatus according to claim 7 further comprising conveyor means for conveying away the grain from said outlet.

9. Apparatus according to claim 7 further comprising a filtered pipe communicating with said outlet and vacuum means connected to said filtered pipe for exhausting dust and foreign matter from said grain.

* * * * *